United States Patent [19]
Cheron et al.

[11] Patent Number: 5,257,849
[45] Date of Patent: Nov. 2, 1993

[54] ROOF OPENING AND CLOSING DEVICE INCORPORATING A SLIDING PANEL, IN PARTICULAR FOR AUTOMOBILE VEHICLES

[75] Inventors: Christian Cheron, Angers; Pierre Thierry, Cholet; Francois De Gaillard, Mouilleron en Pareds, all of France

[73] Assignee: Webasto-Heuliez, Chatelliers-Chateaumur, France

[21] Appl. No.: 895,104

[22] Filed: Jun. 8, 1992

[30] Foreign Application Priority Data

Jun. 13, 1991 [FR] France ................................ 91 07225

[51] Int. Cl.⁵ ............................................... B60J 7/04
[52] U.S. Cl. .................................................. 296/223
[58] Field of Search ........................ 296/223, 222, 221

[56] References Cited

U.S. PATENT DOCUMENTS

| | | | |
|---|---|---|---|
| 4,085,965 | 4/1978 | Schlapp | 296/221 |
| 4,089,557 | 5/1978 | Leiter | 296/221 |
| 4,403,805 | 9/1983 | Strem, Jr. et al. | 296/221 |
| 4,749,227 | 6/1988 | Bienert et al. | 296/221 |
| 4,982,995 | 6/1991 | Takahashi | 296/221 |
| 4,995,665 | 2/1991 | Ichinose et al. | 296/223 |

FOREIGN PATENT DOCUMENTS

| | | | |
|---|---|---|---|
| 3536184 | 10/1985 | Fed. Rep. of Germany | 296/223 |
| 2384640 | 3/1977 | France | 296/223 |
| 2435365 | 9/1979 | France | 296/223 |
| 2648403 | 6/1989 | France | 296/223 |

*Primary Examiner*—Robert R. Song
*Attorney, Agent, or Firm*—Bachman & LaPointe

[57] ABSTRACT

A roof opening and closing device, in particular for an automobile vehicle having a roof in which an opening is formed, comprises a pair of rails fixed on either side of the opening to the top of the roof and four carriages mobile in longitudinal translation in the rails. Four skids functionally related to the carriages are joined to a panel sliding over the roof. The skids carry studs accommodated and moving in guide paths in the carriages to raise the panel above the roof without moving it in translation and to slide it over the roof to uncover the opening.

9 Claims, 2 Drawing Sheets

ROOF OPENING AND CLOSING DEVICE INCORPORATING A SLIDING PANEL, IN PARTICULAR FOR AUTOMOBILE VEHICLES

BACKGROUND OF THE INVENTION

1. Field of the invention

The invention concerns a roof opening and closing device, in particular for an automobile vehicle having a roof with an opening formed in it, comprising a pair of guide rails fixed to the top of the roof one on each side of the opening, a front carriage pair and a rear carriage pair adapted to be moved in longitudinal translation in the guide rails by a pair of cables, a panel mobile in translation relative to the surface of the roof and a mechanism for articulating the panel relative to the surface of the roof functionally related to the carriages to uncover or close the opening by sliding of the panel over the surface of the roof, the panel having a front end and a rear end.

2. Description of the prior art

As a general rule, a roof opening and closing device of this kind is fixed directly to the top of the roof of a vehicle during manufacture or as an adaptation. In such roof opening and closing devices a seal runs around the edge of the opening in the roof to seal the opening in the roof closed position.

Until now, in known roof opening and closing devices, the carriage guide rails have had a curved front end to raise the front end of the panel to separate it from the seal while a slide causes the rear of the mobile panel to pivot in order to slide it across the roof. A known device of this kind is described in the document FR-8907941. Apart from the fact that the curvature of the rails increases the thickness of the roof opening and closing device, the panel tends to rub against the seal at the start of the sliding movement of the panel across the roof. This repeated rubbing of the panel against the seal damages the surface of the seal in time and causes an unpleasant noise.

Consequently, an objective of the invention is to alleviate these drawbacks and in particular to prevent the panel rubbing against the seal during sliding of the panel across the roof.

Essentially, the invention resides in a roof opening and closing device in which the panel is raised and slid by two pairs of skids joined to the panel functionally related to the two pairs of carriages sliding in the rails, the carriages determining the kinematics of the skids and therefore of the panel so as to raise the latter vertically in a first stage over the seal around the edge of the opening in the roof, with no horizontal movement in translation of the panel, which is then slid across the roof from this raised position. The panel is therefore separated from the seal without rubbing against the latter when it is moved away from the opening in the roof.

SUMMARY OF THE INVENTION

To be more specific, the invention consists in a roof opening and closing device, in particular for an automobile vehicle having a roof in which an opening is formed, comprising a pair of guide rails adapted to be fixed to the top of the roof one on each side of the opening, a front carriage pair and a rear carriage pair adapted to be moved in longitudinal translation in the guide rails by a pair of cables, a panel mobile in translation relative to the surface of the roof and a mechanism for articulating the panel relative to the surface of the roof functionally related to the carriages to uncover or close the opening by sliding the panel across the surface of the roof, the panel having a front end and a rear end, the articulation mechanism comprising:

a front skid pair and a rear skid pair respectively joined to the panel at the front and at the rear thereof, the skids being mobile in longitudinal translation in the direction of displacement of the carriages and being functionally related to the front and rear carriages to be raised or lowered vertically relative to the carriages upon sliding of the latter in the guide rails in a vertical direction perpendicular to the surface of the roof;

means for preventing movement in longitudinal translation of the skids during raising or lowering of the skids relative to the carriages.

Advantageously:

the locking means comprise slide plates extending longitudinally in the guide rails, the skids sliding on the upper surface of the plate, each plate comprising a front cut-out and a rear cut-out to enable the front and rear skids respectively to move from a position in which the skids are abutted against the edges of the cut-outs when the panel is aligned with the opening and a position in which they slide on the upper surface of the plate when the panel uncovers the opening;

the slide plates are an integral part of the guide rails;

the front and rear skids have dimensions in the direction of displacement of the carriages in longitudinal translation substantially equal to respective dimensions of the front and rear cut-outs in said direction of displacement of the carriages and the dimensions of the front skids and the front cut-outs are greater than the dimension of the rear skids and the rear cut-outs;

the skids each carry at least one operating member accommodated and moving in at least one guide path means formed in the thickness of each carriage, the guide path means in the carriages being identical, each guide path means comprising a central part having a longitudinal axis at a predetermined angle to the longitudinal axis of the rails to form a slope and two end parts substantially parallel to each other and to the longitudinal axis of the rails merging with respective ends of the central part of the guide path means;

each skid carries two operating members substantially aligned with respect to the longitudinal axis of a rail and each carriage comprises two identical guide path means in which the two operating members are accommodated and move;

the operating members are studs having a substantially circular transverse cross-section whose diameter is substantially equal to the width of the guide path means;

movement in translation of a front carriage and a rear carriage are imparted by the same cable;

the panel is joined to the skids by coupling lugs fixed at one end to the panel and nested at the other end in openings formed in the thickness of the skids.

Other features and advantages of the invention will be better understood from the following description given with reference to the appended diagrammatic drawings.

DETAILED DESCRIPTION OF THE INVENTION

In the figures, the same reference numbers always denote the same parts.

Figure 1:
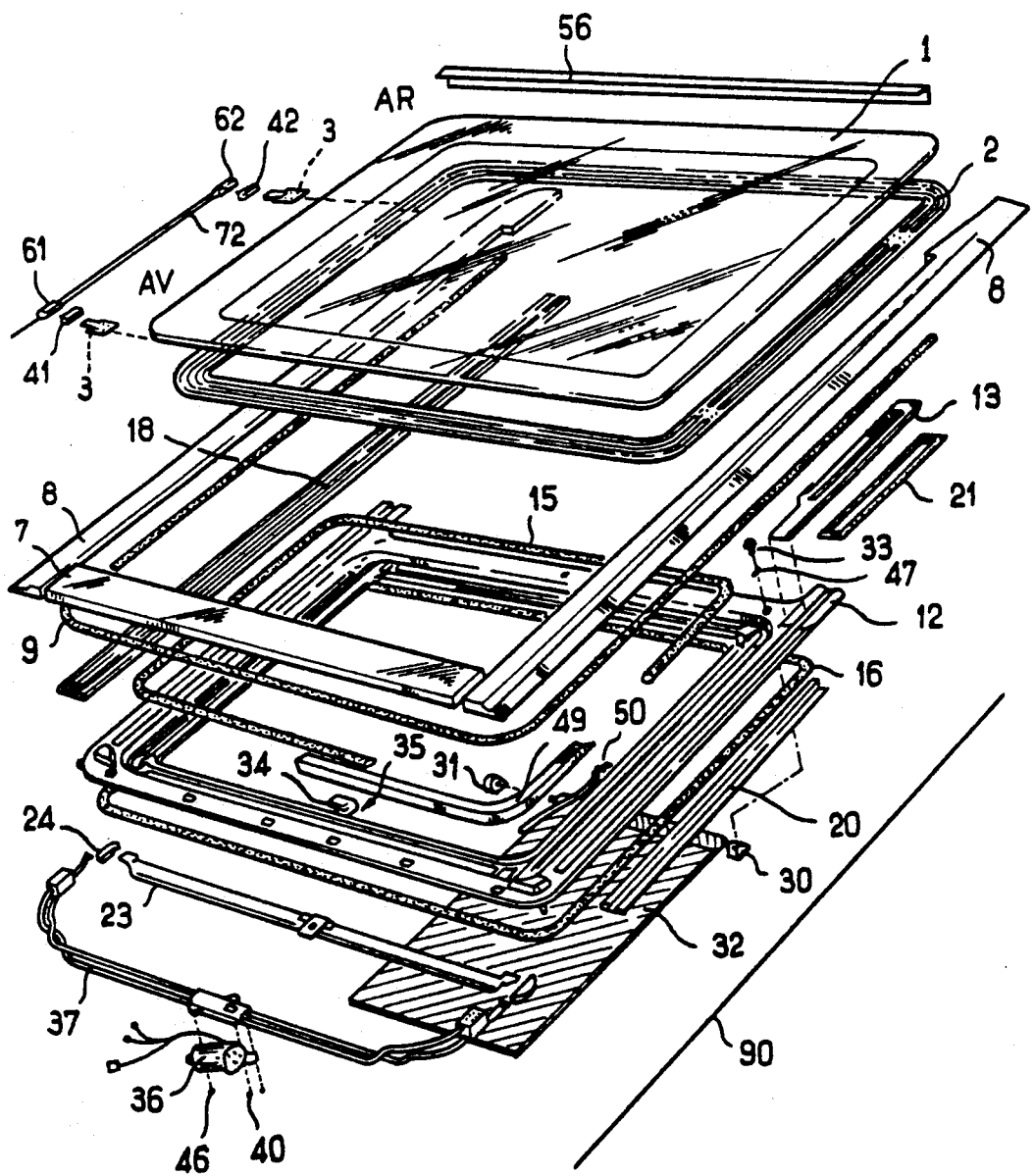
FIG. 1 is an exploded perspective view of a roof opening and closing device in accordance with the invention.

Referring to FIG. 1, a roof opening and closing device in accordance with the invention comprises a first seal 16 disposed between a front gutter plate 12 and the roof 90 of the vehicle. The front gutter plate 12 delimits an opening in the roof 90 and is fixed to the upper surface of the roof by fixing means such as screws 33 and sealing washers 47. The rear part of the front gutter plate 12 is extended by side gutter plates 13 laid over second lateral gutter seals 21 and fixed to the upper surface of the vehicle roof. FIG. 1 shows a single rear gutter plate 13 and a single seal 21 (on the righthand side of the roof opening and closing device).

Guide rails 18 (only one of which is shown on the lefthand side of the roof opening and closing device) are placed and fixed to the top of the gutter plates 12, 13 on either side of the lateral edges of the opening in the roof. The guide rails 18 may be covered by front embellishers 7 and side embellishers 8 provided with a third seal 9.

A fourth seal 15 runs around the perimeter of the opening in the roof. The seal 15 is placed and fixed by adhesive bonding or analogous means to the interior contour of the front gutter plate 12 facing a sliding panel 1.

A wind deflector 49 is articulated in the front gutter plate 12 and is operated by deflector springs 50 which are known in themselves.

A blind 32 is wound around a shaft held in position by fixing lugs 30, 31 at the rear of the front gutter plate 12. The free end of the blind 32 is stapled or adhesively bonded to a crossmember 23 mounted on guide skids 24. The guide skids 24 slide in blind rails 20 to deploy and tension the blind 20 over the opening in the roof. The crossmember 23 is stapled to the front edge of the front gutter plate 12 to anchor means 34 fixed to the latter by screws 36 or the like to tension the blind.

A front carriage pair 61 and a rear carriage pair 62 are disposed in the guide rails 18. A single front carriage 61 and a single rear carriage 62 are shown in the figure (on the lefthand side of the roof opening and closing device). The front carriages 61 and the rear carriages 62 are caused to move in longitudinal translation in the guide rails 18 by a pair of cables 72 sliding inside a cable passage in the rails 18. From the front end of the rails 18 the two cables 72 are inserted in a cable guide tube assembly 37 on which is mounted an electric motor 36 fixed to the cable guide tube assembly 37 by screws 46, 40. The electric motor 36 drives a toothed wheel (not shown) over which the cables 72 are passed. The rotation of the toothed wheel causes displacement of the cables in the rails 18 and in the cable guide assembly 37, the cables moving in opposite directions as is well known. Of course the electric motor 36 could be replaced with a handle known in itself for rotating the toothed wheel. In the rails 18 the front carriages 61 and rear carriages 62 move in opposite directions depending on the direction of rotation of the toothed wheel (clockwise or anticlockwise). As can be seen in this figure, a front carriage 61 is coupled to a rear carriage 62 by the same cable 72 so that they slide together and at the same time in a guide rail 18. That is to say that for a first direction of rotation of the toothed wheel driving the two cables 72, the carriages 61, 62 move from the front towards the rear of the rail and for a second direction of rotation of the toothed wheel the carriages 61, 62 move from the rear towards the front of the rail.

Two pairs of skids 41, 42 (only one pair being shown on the lefthand side of the roof opening and closing device) are connected to the panel 1 which is fixed to a stiffener frame 2 by means of two pairs of fixing lugs 3 respectively at the front and at the rear of the panel 1. In the roof closed position the panel 1 completely closes the opening in the roof and its edges bear against the seal 15. In accordance with the invention, the skids 41, 42 are functionally related to the carriages 61, 62, that is to say that the carriages 61, 62 determine the kinematics of the skids 41, 42 to raise the panel 1 above the seal 15 by virtue of the action of the cable 72 and then to slide the panel 1 towards the rear of the roof across the latter. Also, a finishing section 56 is fixed to the rear of the panel 1.

Given that this roof opening and closing device in accordance with the invention is substantially symmetrical relative to its longitudinal axis, i.e. the direction of sliding of the panel 1 across the roof, only the lefthand articulation mechanism of the panel 1 seen in FIG. 1 will be described hereinafter.

Figure 2:
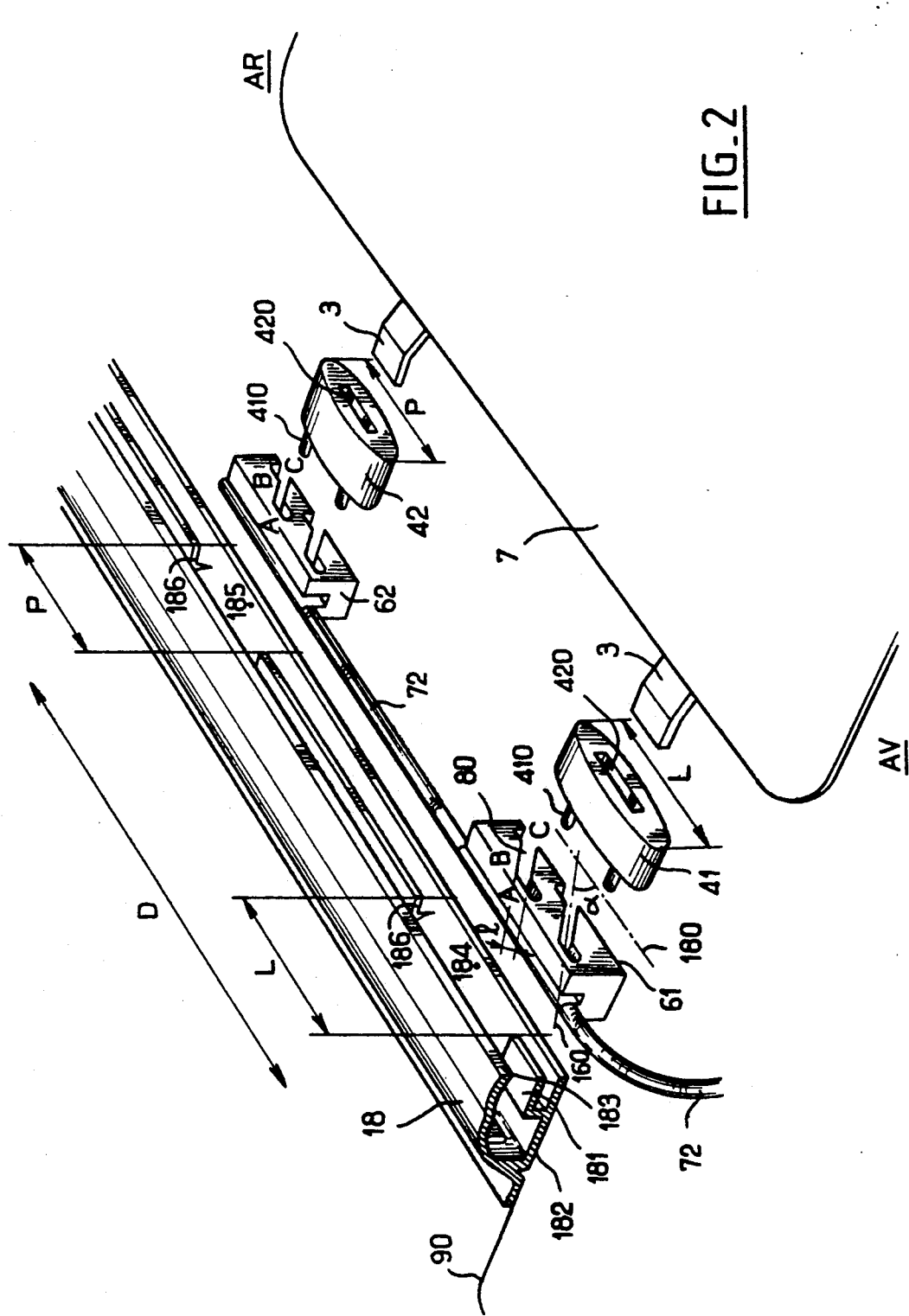
FIG. 2 is a perspective view of an articulation mechanism of this device.

Referring to FIG. 2, this articulation mechanism comprises a front skid 41 and a rear skid 42 respectively joined to the front and to the rear of the panel 1 at one side of the latter, the front skid 41 and the rear skid 42 being respectively connected to the front carriage 61 and to the rear carriage 62. The front and rear skids 41, 42 are joined to the panel 1 by a pair of coupling lugs 3 each having one end fixed to the panel 1 by adhesive bonding or the like and the other end nested in openings 420 provided in the thickness of the skids 41, 42.

The guide rail 18 has a substantially U-shape transverse cross-section and comprises a slide plate 181 extending longitudinally in the rail 18 between the two branches of the U-shape. The slide plate 181 has an upper surface substantially parallel to one of the branches 182 of the U-shape. The upper branch of the U-shape facing the branch 182 carries on its outside edge a flange 183 bent at 90° to delimit a front and rear skid 41, 42 sliding space between the slide plate 181 and the upper flange of the rail 18. As a general rule the slide plate 181 and the flange 183 are integral parts of the guide rail 18. As shown in FIG. 2, the slide plate 181 comprises a front cut-out 184 and a rear cut-out 185 to enable the front and rear skids respectively to go from a position in which they are immobilized between the edges 186 of the cut-out on the lower flange 182 of the rail 18 when the panel 1 is aligned with the opening and a position in which they slide on the top of the upper surface of the plate 181 when the panel uncovers the opening.

The front and rear carriages 61, 62 are disposed in the back of the rail 18 to the rear of the slide plate 181 to move in longitudinal translation in the rail 18 due to the action of the cable 72. The skids 41, 42 carry operating studs 410 projecting towards the carriages 61, 62 and accommodated and moving in guide path means 80 formed in the thickness of the carriages 61, 62. In FIG. 2, each front and rear skid carries two operating studs 410 aligned parallel to the longitudinal axis of the rail 18 and each front and rear carriage 61, 62 respectively comprises two identical and parallel guide path means 80 to receive the two operating studs 410. Of course, each skid and each carriage may be provided with a single operating stud and a single guide path means if the panel 1 is sufficiently light in weight. The operating studs 410 have a substantially circular transverse cross-section whose diameter is substantially equal to the width 1 of the guide path means and they may be fitted with rollers to facilitate their movement in the guide path means.

A guide path means of a carriage 61, 62 comprises a central part B having a longitudinal axis 160 at an angle α (in the order of 45°) to the longitudinal axis 180 of the rail 18 to form a slope and two end parts A and C connected to the ends of the central part B substantially parallel to each other and to the axis 180. The end part C in contact with the lower flange 182 of the rail 18 is preferably open.

The front skid 41 and the rear skid 42 have respective dimensions L, P in the direction D of displacement of the carriages in longitudinal translation in the rail 18 substantially equal to the dimensions L, P of the front and rear cut-outs 184 and 185 in the slide plate 181 so that the front and rear skids 41, 42 can be inserted in said cut-outs. Also, the dimension L of the front skid 41 and of the front cut-out 184 is greater than the dimension P of the rear skid 42 and the rear cut-out 185.

The operation of the articulation mechanism will now be described.

As previously described, the front carriage 61 and the rear carriage 62 are simultaneously displaced in longitudinal translation in the rail 18 when the cable 72 is operated. In the roof closed position each operating stud 410 accommodated in a guide path means 80 is substantially in the horizontal part C joined to the lower end of the central part B. In this position each skid 41, 42 is immobilized between the edges 186 of the cut-outs 184, 185 so that it is unable to move in the direction D.

When the cable 72 is moved in the first direction the carriages 41, 42 are moved towards the rear of the roof and cause the operating studs 410 to move in the guide path means 80. For this direction of displacement of the carriages 61, 62 the four operating studs 410 move in the central part B and then in the end part A of the guide path means 80, the operating studs 410 remaining aligned with each other at all times and parallel to the longitudinal axis of the rail 18. The effect of the simultaneous displacement of the operating studs 410 is to raise the skids 41, 42 vertically, in a vertical direction perpendicular to the surface of the roof, so that the panel 1 is raised above the seal 15 until the operating studs 410 abut the end part A of the guide path means 80. In this position the skids 41, 42 slide on the upper surface of the slide plate 181 due to the continuing movement of the cable 72 and so uncover the opening in the roof. As previously mentioned, the dimension L of the front skid 41 and of the front cut-out 184 is greater than the dimension P of the rear skid 42 and of the rear cut-out 185 with the result that the front skid 41 will not enter the rear cut-out 185 when it passes over the latter during sliding movement of the panel 1.

Likewise, on movement of the cable 72 in the second direction, starting from the roof open position, the front skid 41 will slide over the rear cut-out 185 without being immobilized in it. Upon movement in this second direction the operating studs 410 are positioned at the junction of the horizontal part A and the inclined part B of the guide path means and are caused to slide longitudinally in the direction D until the front and rear skids 41, 42 are facing the respective front and rear cut-outs 184, 185. On reaching this position the front and rear skids 41, 42 are lowered vertically in the front and rear cut-outs 184, 185 as a result of the displacement of the operating studs 410 in the inclined parts B of the guide path means 80. The operating studs 410 are then positioned in the end part C of the guide path means 80 by further movement of the cable 72. In this position the panel 1 closes the opening in the roof and compresses the seal 15 to seal the opening.

Thus the panel 1 does not rub against the seal 15 during uncovering or closing of the opening in the roof because the panel 1 is raised or lowered vertically during these two operations. In accordance with the invention, the height of the slope defined by the guide means 80 is approximately 6 mm, substantially the thickness of the roof opening and closing device.

Of course, the invention is not limited to the embodiment described hereinabove and other variants are feasible without departing from the scope of the invention.

We claim:

1. A roof opening and closing device, in particular for an automobile vehicle having a roof in which an opening if formed, comprising a pair of guide rails adapted to be fixed to the top of said roof one on each side of said opening, a front carriage pair and a rear carriage pair adapted to be moved in longitudinal translation in said guide rails by a pair of cables, a panel mobile in translation relative to the surface of said roof and a mechanism for articulating said panel relative to the surface of said roof functionally related to said carriages to uncover or close said opening by sliding said panel across the surfaces of said roof, said panel having a front end and a rear end, said articulation mechanism comprising:

a front skid pair and a rear skid pair to be fixedly connected to said panel respectively at the front and the rear portions thereof, said skids being mobile in longitudinal translation in the direction of displacement of said carriages and means for operatively connecting the front carriage pair and the rear carriage pair respectively to the front skid pair and the rear skid pair so that the front skid pair and the rear skid pair are raised or lowered vertically relative to said carriages upon sliding of the carriages in said guide rails in a vertical direction perpendicular to the surface of said roof; and means for preventing movement in longitudinal translation of said skids during raising or lowering of said skids relative to said carriages.

2. Device according to claim 1 wherein said movement preventing means comprise slide plates extending longitudinally in said guide rails, said skids sliding on the upper surface of said plates, each plate comprising a front cut-out and a rear cut-out to enable said front and rear skids respectively to move from a position in which said skids are abutted against the edges of said cut-outs when said panel is aligned with said opening and a position in which they slide on the upper surface of said plate when said panel uncovers said opening.

3. Device according to claim 2 wherein said slide plates are an integral part of said guide rails.

4. Device according to claim 2 wherein said front and rear skids have dimensions in the direction of displacement of said carriages in longitudinal translation substantially equal to respective dimensions of said front and rear cut-outs in said direction of displacement of said carriages and the dimensions of said front skids and said front cut-outs are greater than the dimension of said rear skids and said rear cut-outs.

5. Device according to claim 1 wherein said skids each carry at least one operating member accommodated and moving in at least one guide path means formed in the thickness of each carriage, said guide path means in said carriages being identical, each guide path means comprising a central part having a longitudinal axis at a predetermined angle to the longitudinal axis of said rails to form a slope and two end parts substantially parallel to each other and to the longitudinal axis of said rails merging with respective ends of said central part of said guide path means.

6. Device according to claim 5 wherein each skid carries two operating members substantially aligned with respect to the longitudinal axis of a rail and each carriage comprises two identical guide path means in which said two operating members are accommodated and move.

7. Device according to claim 5 wherein said operating members are studs having a substantially circular transverse cross-section whose diameter is substantially equal to the width of said guide path means.

8. Device according to claim 1 wherein movement in translation of a front carriage and a rear carriage are imparted by the same cable.

9. Device according to claim 1 wherein said panel is joined to said skids by coupling lugs fixed at one end to said panel and nested at the other end in openings formed in the thickness of said skids.

* * * * *

UNITED STATES PATENT AND TRADEMARK OFFICE
CERTIFICATE OF CORRECTION

PATENT NO. : 5,257,849

DATED : NOVEMBER 2, 1993

INVENTOR(S) : CHRISTIAN CHERON ET AL.

It is certified that error appears in the above-identified patent and that said Letters Patent is hereby corrected as shown below:

IN COLUMN 6, CLAIM 1, LINE 3, "if" SHOULD READ --is--.

Signed and Sealed this

Twenty-fourth Day of May, 1994

*Attest:*

BRUCE LEHMAN

*Attesting Officer*     *Commissioner of Patents and Trademarks*